United States Patent [19]

Bothe et al.

[11] Patent Number: 5,013,601
[45] Date of Patent: May 7, 1991

[54] SELF-SUPPORTING SHEET-LIKE ARTICLE WITH SUPERIOR ANTISTATIC CHARACTERISTICS

[75] Inventors: Lothar Bothe, Mainz-Gonsenheim; John D. Gribbin, Schlangenbad; Peter Dinter, Oestrich-Winkel, all of Fed. Rep. of Germany

[73] Assignee: Hoechst Aktiengesellschaft, Frankfurt am Main, Fed. Rep. of Germany

[21] Appl. No.: 236,377

[22] Filed: Aug. 25, 1988

[30] Foreign Application Priority Data

Sep. 24, 1987 [DE] Fed. Rep. of Germany ....... 3732166

[51] Int. Cl.$^5$ .......................... B32B 5/16; B29C 59/12
[52] U.S. Cl. .................................... 428/323; 428/922; 428/910; 428/308.4; 428/308.8; 428/516; 428/447; 428/448; 428/518; 428/483; 428/422; 428/412; 428/473.5; 428/474.4; 428/480; 428/500; 204/165; 427/39; 264/176.1
[58] Field of Search ...................... 428/922, 323, 516; 204/165

[56] References Cited

U.S. PATENT DOCUMENTS 3,808,115  4/1974  Manion et al. .................... 204/165
4,247,496  1/1981  Kawakami et al. ................. 264/22

OTHER PUBLICATIONS

Naber, "Antistatische Ausrüstung von Polymeren Eine Literaturübersicht," (Anti-Static Equipment of Polymers, A Literature Review); Plaste und Kautschuk, 1981, pp. 6-9.

Ullmanns Encyklopädie der technischen Chemie (Ullmann's Encyclopaedia of Technical Chemistry), Verlag Chemie, Weinheim, 4th new expanded edition (1976), pp. 673-685.

Encyclopedia of Polymer Science and Engineering, vol. 7, John Wiley & Sons, 1973, pp. 73-125.

*Primary Examiner*—P. C. Sluby
*Attorney, Agent, or Firm*—Foley & Lardner

[57] ABSTRACT

A self-supporting sheet-like article is described which is comprised of a substrate layer and an antistatic coating applied to at least one surface of the substrate layer. The antistatic coating is produced by the treatment of at least one surface of the substrate layer with an electrical corona discharge which runs between a live electrode and a counter electrode. Simultaneously, i.e. during the corona discharge, an aerosol is introduced into the corona discharge area, which aerosol contains an antistatic agent. Furthermore, a procedure for the production of a self-supporting sheet-like article with an antistatic coating as well as a firmly adhering antistatic coating on a polymer substrate are described.

18 Claims, 1 Drawing Sheet

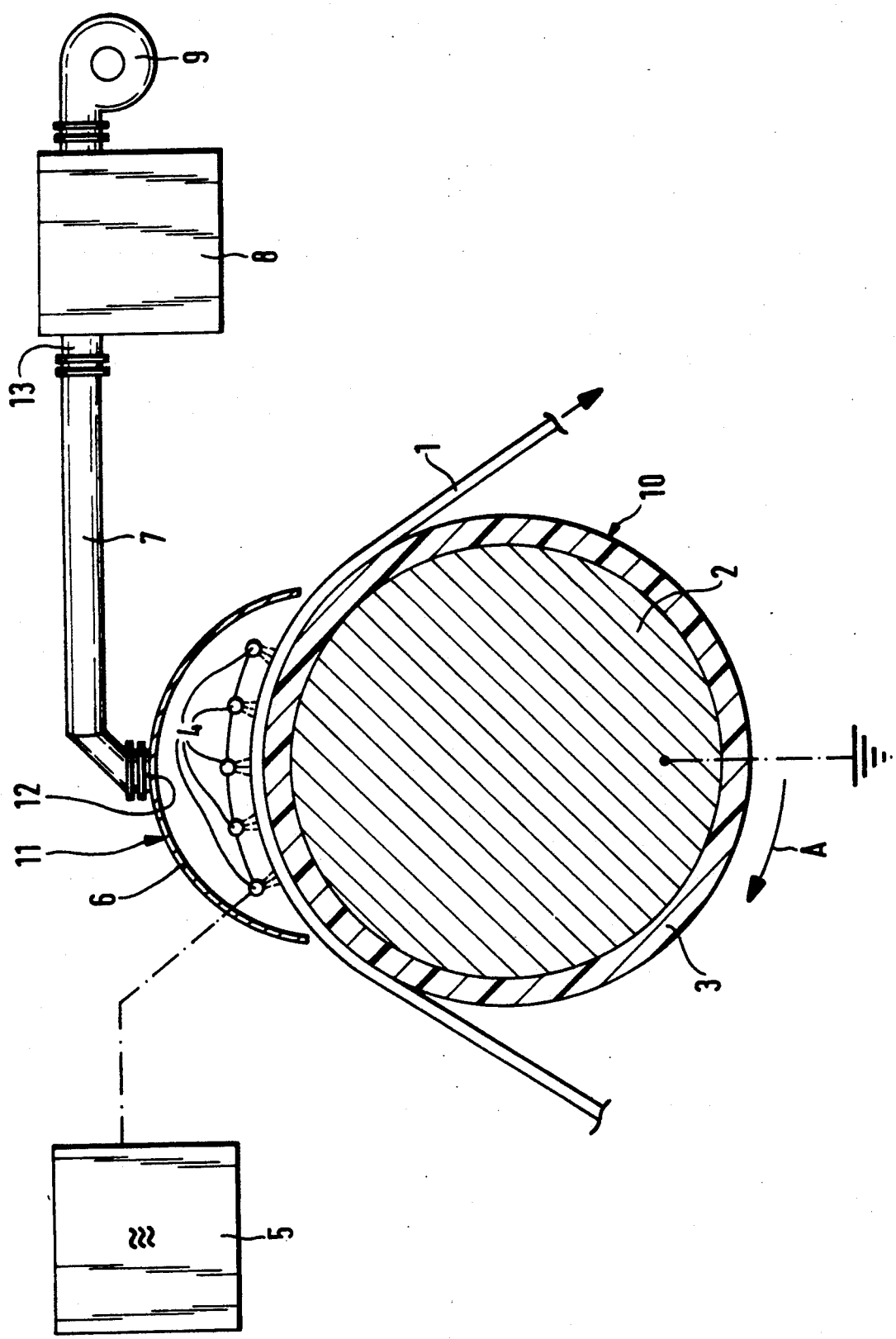

SELF-SUPPORTING SHEET-LIKE ARTICLE WITH SUPERIOR ANTISTATIC CHARACTERISTICS

BACKGROUND OF THE INVENTION

(1) Field Of The Invention

The invention relates to a self-supporting sheet-like article comprising a substrate layer and an antistatic coating on at least one surface of the substrate layer.

The invention also relates to a process for the production of a sheet-like article according to this invention with an antistatic coating and to a firmly adhering antistatic coating on a polymer substrate.

(2) Prior Art

Because of their chemical composition, many working materials are not at all conductive for electric current or only conductive to a degree which practically cannot be measured, and therefore they are generally considered to be insulators. However, the low conductivity of these working materials is the reason that they often collect very high electrostatic charges at their surfaces which, especially with sheet-like polymer products such as films and panels, can lead to a multitude of disadvantageous disturbances, even to a complete uselessness of the product. This is highly undesirable. The charges occur during production, processing, or use of the sheet-like products, wherever there are friction processes at the edges, turning rods, etc., where two materials touch and then separate again (separation process), for example, at rollers. This can lead to production disturbances, dust collection, interferences with measuring and control instruments, and even to explosions. When sheet-like polymer substrates are printed, i.e. using screen-printing processes, the electrostatic charges can have such a negative effect that the ink "jumps" from the printing form or stencil. High static charges (more than 5,000V) can ignite the gas/air mixtures of the evaporated solvents, and low static charges (less than 1,000V) can optically affect or destroy the surfaces by causing the formation of strias and dust and dirt collection.

The scientific and physical relationships which lead to the occurrence of electrostatic charges are not always clear. However, generally it is assumed that, upon contact between solid bodies, electrons or ions change from one body to another. This change is accelerated by friction because the actual contact areas become larger.

The amount of the electrostatic charge depends on the electrical conductivity of the materials. Good conductors are, for example, metal, carbonblack, graphite, and polyenes. As good conductors, they loose their charge immediately, while bad conductors, especially polymers, maintain their charge over a longer period of time (seconds or minutes and sometimes even days).

The aforementioned problems as well as several attempts to solve them have been described and discussed in numerous references, for example, B. Naber, "Anti-Static Equipment of Polymers, A Literature Review" in "Plaste und Kautschuk" (1981), pages 6–9. However, all the many conventional solutions need improvement, especially with regard to the uniformity and durability of the antistatic equipment.

Therefore, it was an object of this invention to develop sheet-like articles such as films, panels, fabrics, particularly webs, of materials with low electrical conductivity, which have superior antistatic characteristics, especially with regard to the uniformity of the antistatic coating over the entire surface as well as the resistance to mechanical effects.

SUMMARY OF THE INVENTION

This object is accomplished by a sheet-like article of the above-mentioned kind which is characterized in that the antistatic coating is created by treating at least one surface of the substrate layer by means of an electrical corona discharge, which runs between a live electrode and a counter electrode whereby during the corona discharge, an aerosol containing an antistatic agent, is simultaneously blown into the corona discharge area.

BRIEF DESCRIPTION OF THE DRAWING

The drawing is a cross-sectional side view of the aerosol corona discharge device of the present invention.

DESCRIPTION OF THE INVENTION

Within the framework of this invention, basically all materials can be used for the substrate layer which fall under the above-mentioned category of materials with expressively low electrical conductivity, especially polymers which can be used in the form of films, sheets, plates or fabrics.

Examples of suitable polymers especially include polymer films, for example, films of natural and synthetic polymers such as cellulose, cellulose esters, polyvinyl chloride, polystyrene, styrene copolymers with butadiene, polycarbonate, polymers and copolymers of olefins such as ethylene, propylene, butylene, methylpentene, etc., polysulfone, aliphatic and aromatic polyesters, polyimides, polyisobutylene, polymethyl methacrylate, polyphenylene sulfide, polyurethane, polyamide, polyaryl ether ketone, polyaryl ether ester ketone, polyaryl ether sulfone, polyamide imide, polyether imide, etc. [see Ullmanns Encyclopaedie der technischen Chemie (see Ulhmann's Encyclopedia of Technical Chemistry), Verlag Chemie, Weinheim, 4th new expanded edition (1976), pages 673 ff; Encyclopedia of Polymer Science and Eng., Vol. 7, John Wiley & Sons (1973), pages 73 ff]. The production of self-supporting oriented or non-oriented films from the aforementioned polymers is performed according to several conventional technologies, which also are described in the aforementioned literature; the term "self-supporting films" denotes both monofilms of one layer and multilayered films of plastic materials or of nonplastic materials, such as paper or metal, which comprise several layers of identical or different polymer materials or laminates.

As far as paper is concerned, all kinds of the usual paper can be used in connection with the present invention, papers which are impregnated with synthetic resins and which are especially susceptible to electrostatic charges, being particularly preferably used as substrate layers according to this invention. Furthermore, so-called synthetic papers, a detailed description of which is given in "Synthetic Polymers And The Paper Industry", by Vladimir M. Wolpert, Miller Freeman Publication, Inc., San Francisco (USP), 1977, are of particular interest. The sheet-like articles described therein, which contain inorganic fillers, such as $CaCO_3$, $TiO_2$, $SiO_2$, etc., generally present the problem that the antistatic agents distributed within the film are absorbed at the surfaces of the fillers, and thus their antistatic effect is reduced. Therefore, the present invention offers particularly great advantages in respect of this type of sheet-like articles.

As an example of plate-shaped substrate layers, in particular substrate layers using foamed polymers (for example, polystyrene) should be mentioned.

With regard to fabrics, all kinds of fabrics can be provided with the antistatic properties according to the invention, with special preference being given to synthetic fiber fabrics. Examples of these are fabrics based on polyesters, polyacrylonitrile, polyamides, and viscose, as well as mixtures of these or mixtures of these with natural fibers. To print the fabrics or especially to improve the wearing properties of clothes, it is desirable to equip the fabrics with an effective and especially durable antistatic coating, as this invention suggests.

The antistatic coating on the substrate layer is produced by the simultaneous effect of an electrical corona discharge and of an aerosol on the substrate surface. The corona discharge triggers and enhances reaction mechanisms by which a chemical surface modification of the substrate treated is achieved. It is supposed that through the corona discharge the aerosol or, respectively, the antistatic agents contained in it are firmly anchored to the substrate surface.

For the corona discharge, the live electrode is supplied with an alternating current voltage between 5,000 and 25,000V by a high-voltage generator. The alternating voltage between the live electrode and the grounded counter electrode should be proportional to the transportation speed of the substrate through the corona discharge area, i.e., at a higher transportation speed, the alternating voltage should be in the upper range, while at a lower transportation speed, an average or lower voltage, in the range of 5,000 to 18,000V, can be applied in order to obtain a comparable effect.

The aerosols can be produced using conventional two-material atomization nozzles or preferably using piezoelectric ultrasound atomization systems. For the production of the aerosols, emulsions, preferably dispersions and solutions of low and/or high molecular weight antistatic agents in solvents or dispersants, especially in water, can be used.

The procedure for the treatment of the surfaces of plastic substrates by means of a corona discharge with simultaneous aerosol atomization, as well as an arrangement for this procedure, are described in detail in German Patent Application P 37 05 482.1.

According to the invention, suitable antistatic agents for aqueous solution/dispersions include, for example, quaternary ammonium compounds (for example, choline chloride, choline ester chloride), alkyl sulfonates and alkyl sulfates, amino salts, or polymers and copolymers containing quaternary ammonium chloride groupings.

According to the invention, the antistatic agent is first dissolved or dispersed in a solvent or dispersant, using preferably an aqueous solvent or dispersant, and then the solution or dispersion is atomized in the corona discharge areas as an aerosol together with a carrier-gas stream. The solutions have a concentration of 0.5 to 40 weight percent of antistatic agent, calculated on the total weight of the solution. The dispersions generally have a solid content of 5 to 50 weight percent, also calculated based on the total weight of the dispersion.

In the simplest embodiment, air can be used as the carrier gas, but also nitrogen or another inert gas, for example, a noble gas, can be used. Especially advantageous anchoring effects can be achieved, on the other hand, with reactive gases such as halogens, carbon dioxide, ammonia, or formaldehyde, sometimes in mixtures with inert gases.

According to the procedure of the invention, the antistatic coating can be applied off-line to the substrate layer after it is finished; this is especially done if paper or plate-shaped substrate layers are to be used. However, the antistatic coating can as well be applied inline during the manufacturing process of the substrate layer. It is known that, for example, biaxially oriented films of thermoplastic synthetic materials can be produced by melt extruding, subsequent biaxial stretchorienting, and final heat setting. Here, the antistatic coating can be applied before, between, or after the individual sequential stretch maneuvers, or before or after the heat setting. In the case of fabrics, the antistatic coating can be applied during the fiber production or to the already finished fabric.

Because of the special application procedure of this invention, the antistatic coating exhibits an especially good adhesion on the substrate surface. The layer thickness of the antistatic coating usually corresponds to a weight per unit area of only 0.2 to 10 mg/m$^2$.

The sheet-like article according to this invention can be used whenever antistatic characteristics are desired. As an example, use as packing films on fast-running packing machines or the use of films for adhesive tapes or magnetic tapes should be especially mentioned. If prints or additional coatings are to be applied, then, as mentioned before, the antistatic characteristics are especially important. This applies to all materials for substrate layers within the framework of this invention. Other areas of application for the sheet-like articles of the invention are laminating techniques and the use as release sheets.

The invention and its advantages are further explained with reference to the following examples:

Several polymer films were treated with the aid of an aerosol corona device according to the attached figure. The device comprises generator 5 and corona discharge device 11. The generator supplies discharge electrodes 4 of corona discharge device 11 with a high-frequency alternating current of high voltage. Metal core 2 of roller 10 serves as a grounded counter electrode. Self-supporting polymer-film web 1 is guided over the circumferential coating 3 of roller 10. Casing 6 surrounds electrodes 4 of corona discharge device 11; it is connected to atomization device 8 via line 7. In atomization device 8, an aqueous fluid is atomized in a free-floating aerosol by an ultrasound system which works using piezoelectricity. Blower 9 is connected to the atomization device and transports the carrier gas (air) for the aerosol through the atomization device into corona discharge device 11.

The transportation speed of the self-supporting polymer films was 20 m/min, if not otherwise indicated. The corona capacity was 1,000W each (corresponding to an adjustment to 5,500V).

The antistatic characteristics in the Examples and Comparative Examples were determined by measuring the electrical surface resistance according to DIN 53 482.

The surface resistances were measured at five places each, distributed over the entire film width.

EXAMPLE 1

Employing the coextrusion procedure, 1 mm thick threelayered films were extruded from a slot die having a gap width of 280 mm and a gap height of 1.88 mm, at an extrusion temperature of 260° C. and a delivered amount of 70 kg/h. The base layer in each case consisted of polypropylene with a melt flow index of 2 g/10 min (at 230° C. and a 2.16 kg loading). The two cover layers were composed differently. The coextruded films were chilled at 30° C. on a chilling roll having a diameter of 600 mm, after passing through an air path of 20 mm length. The chill roll ran with a circumference speed of 4.5 m/min. The films were than transferred from the chill roll to a three-roll arrangement which also had a temperature of 30° C. and ran at a circumference speed of 4.5 m/min. After being heated to 130° C., the films were stretched lengthwise by a factor of 5 by another three-roll arrangement. Subsequently, they were stretched crosswise by a factor of 10 at 175° C. The final heat-setting was performed at 160° C. over 5 sec.

The base layers of the resulting muti-layered films were each 19/$\mu$m thick. The cover layers applied onto both sides had thicknesses of 0.5 to 0.8/$\mu$m each. The cover layers consisted of a polypropylene with a melt flow index of 4 g/10 min (at 230° C. and 2.16 kg loading), and contained 0.2 weight percent sodium benzoate (the particles being smaller than 10/$\mu$m, and the average particle diameter being 1.6/$\mu$m) and 0.4 weight percent of aluminum silicate with an aspect ratio of 6 (the particles are smaller than 10/$\mu$m, and the average particle size is 0.55/$\mu$m.

The film produced in this way was treated by means of three different procedures, using an aerosol of a 4 weight percent strength aqueous solution of a quaternary ammonium salt according to the following formula

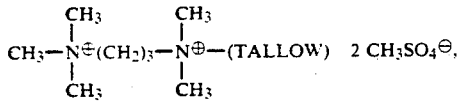

which is commercially available under the trade name ®LEOMIN FA as an antistatic agent.

Procedure $V_1$: Combination, according to the invention, of a corona treatment and a simultaneous aerosol supply.

Procedure $V_2$: Aerosol supply without corona treatment.

Procedure $V_3$: First corona treatment without an aerosol supply, then an aerosol supply (without a simultaneous corona treatment).

The results are compiled in the following table as Example 1 and Comparative Examples (VB) 1A and 1B.

EXAMPLE 2

As in Example 1, a film was treated with a 1 weight percent strength aqueous solution of choline ester chloride, an antistatic agent which is commercially available from Messrs. Antistatika Peter Urdahl under the trade name ®HB 155, in the form of an aerosol according to the procedures $V_1$ to $V_3$ explained in Example 1.

The results of this test are shown as Example 2 and as Comparative Examples VB 2A and VB 2B in the table.

EXAMPLE 3A

A polypropylene film provided with cover layers on both sides was coextruded through a slot die, at a temperature of approximately 270° C. The mixture (melt) of the film forming the base layer was comprised of 80 parts by weight of a propylene homopolymer and 20 parts by weight of pulverulent calcium carbonate with an average particle size of 3.8/$\mu$m. The melt of the polymers forming the cover layers was comprised of a random copolymer of propylene and 4 weight percent of ethylene. After cooling the coextruded film to approximately 30° C. on a chill roll, the film was stretched lengthwise at 125° C., at a stretch ratio of 6.0; subsequently, it was stretched crosswise at 165° C., at a stretch ratio of 9.0. The final heat-setting was performed at 160° C. for 5 sec.

The resulting opaque multilayered film had a density of 0.46 g/cm$^3$ and a thickness of 35/$\mu$m; the thickness of the heat-sealable layers was 1/$\mu$m each.

The film was treated using a solution of the ®HB 155 antistatic agent mentioned in Example 2, according to the procedures $V_1$ to $V_3$ mentioned in Example 1. The test results are shown as Example 3A and Comparative Examples VB 3A and VB 3B in the table.

EXAMPLE 3B

Example 3A was repeated with the exception that each of the cover layers additionally comprised 6 weight percent, relative to the weight of the respective cover layer, of TiO$_2$ particles, which were added to increase the paperlike character of the film described in Example 3A. The test results substantially correspond to the results of Example 3A and are compiled in the Table below.

EXAMPLE 4

A polyethylene terephthalate raw material containing 3,000 ppm of barium sulfate as a slip agent was molten, extruded into a film through a slot die, and chilled to an amorphous film on a high-polish chill-roll having a surface temperature of 40° C. Subsequently, the pre-film was stretched lengthwise at 95° C. and crosswise at 110° C. with a surface-stretching ratio of 13. The 14.5-/$\mu$m thick film thus obtained was then heat-set at a tenter temperature of 230° C.

The film of Example 4 was treated, according to the procedures $V_1$ to $V_3$ of Example 1, with a solution of the ®Leomin FA antistatic agent also mentioned in Example 1. The results are shown in the table as Example 4 and Comparative Examples VB 4A and VB 4B.

EXAMPLE 5

A biaxially stretch-oriented polyethylene terephtalate film which was coated off-line on both sides with a coating of cross-linked polydimethylsiloxane and which had a total thickness of 50/$\mu$m, with the cover layers each at the most 50 nm thick, was treated with a solution according to procedure $V_1$ in Example 1. The result and the surface resistances measured for this film are shown in the table under Example 5.

EXAMPLE 6

A hard film of polyvinyl chloride with a thickness of 50/$\mu$m, comprised of S-PVC with a K value of 60, was treated according to the procedures $V_1$ to $V_3$ using the solution of Example 1.

The results of these tests are shown in the table under Example 6 and Comparison Examples VB 6A and VB 6B.

EXAMPLE 7

A film of polytetrafluoroethylene with a layer thickness of 100/μm was treated with the solution of the antistatic product described in Example 1 according to the procedure $V_1$. The result is shown in the table as Example 7.

| Examples | Surface Resistance Measured* Over the Film Width | | | | | Uniformity Over The Film Width |
|---|---|---|---|---|---|---|
| | 1 | 2 | 3 | 4 | 5 | |
| Example 1 | $8.10^7$ | $8.10^7$ | $7.10^7$ | $7.10^7$ | $8.10^7$ | Very good |
| VB 1A | $5.10^{12}$ | $1.10^{12}$ | $9.10^{12}$ | $5.10^{12}$ | $8.10^{11}$ | Mediocre |
| VB 1B | $6.10^9$ | $4.10^{10}$ | $8.10^{10}$ | $8.10^9$ | $3.10^9$ | Mediocre |
| Example 2 | $3.10^7$ | $3.10^7$ | $2.10^7$ | $2.10^7$ | $3.10^7$ | Very good |
| VB 2A | $8.10^{11}$ | $3.10^{12}$ | $4.10^{11}$ | $9.10^{12}$ | $4.10^{11}$ | Mediocre |
| VB 2B | $2.10^9$ | $2.10^{10}$ | $6.10^{10}$ | $5.10^9$ | $4.10^{10}$ | Mediocre |
| Example 3A | $1.10^7$ | $2.10^7$ | $2.10^7$ | $1.10^7$ | $2.10^7$ | Very good |
| Example 3B | $1.10^7$ | $1.10^7$ | $2.10^7$ | $2.10^7$ | $1.10^7$ | Very good |
| VB 3A | $3.10^{12}$ | $5.10^{11}$ | $8.10^{12}$ | $2.10^{12}$ | $3.10^{11}$ | Mediocre |
| VB 3B | $4.10^{10}$ | $3.10^9$ | $6.10^9$ | $4.10^9$ | $7.10^{10}$ | Mediocre |
| Example 4 | $2.10^7$ | $2.10^7$ | $3.10^7$ | $3.10^7$ | $3.10^7$ | Very good |
| VB 4A | $4.10^9$ | $4.10^{12}$ | $6.10^{10}$ | $8.10^{11}$ | $2.10^{10}$ | Mediocre |
| VB 4B | $9.10^9$ | $6.10^9$ | $2.10^{10}$ | $3.10^9$ | $7.10^9$ | Mediocre |
| Example 5 | $3.10^8$ | $3.10^8$ | $4.10^8$ | $3.10^8$ | $3.10^8$ | Very good |
| Example 6 | $2.10^7$ | $1.10^7$ | $2.10^7$ | $1.10^7$ | $1.10^7$ | Very good |
| VB 6A | $1.10^{10}$ | $5.10^{10}$ | $6.10^{11}$ | $2.10^{10}$ | $1.10^{11}$ | Mediocre |
| VB 6B | $8.10^8$ | $5.10^8$ | $2.10^9$ | $6.10^9$ | $6.10^8$ | Mediocre |
| Example 7 | $1.10^9$ | $2.10^9$ | $2.10^9$ | $2.10^9$ | $2.10^9$ | Very good** |

*Unit of the surface resistance: [Ω]
**In Example 7, because of the low film width (10 cm) of the pattern, the uniformity of the surface resistance has been determined at a distance of 1 m each in the direction of the film.

The surface resistance to the untreated film in all examples was above $10^{13} \Omega$.

Another advantage of the invention is the especially firm adhesive anchoring of the antistatic coating on the substrate layer. The durability of anchoring of the antistatic coating under mechanical strain was tested with films according to Examples 3A, VB 3A, and VB 3B. For this purpose, cotton balls were passed ten times each over the film surface with a pressure of 1 to 5 kPa. With the films of the invention (Example 3A), the surface resistance was not affected. With films according to VB 3A and VB 3B, the surface resistance rose by approximately two ten-level potencies.

Furthermore, a sheet offset printing test was made using films according to Example 3A, VB 3A, and VB 3B. For this purpose, stacks of one thousand sheets (size: 500 mm × 700 mm) were made from the respective films; they were then processed on an offset press machine. The film of the invention exhibited no processing problems, but the comparative films caused serious problems in the printing process, since during the automatic withdrawal of the uppermost film sheet almost always two or more film sheets were removed from the stack, due to the antistatic charge, which made further printing impossible.

What is claimed is:

1. A self-supporting sheet-like article comprising a substrate layer and an antistatic coating on at least one surface of said substrate layer, said antistatic coating being obtained by subjecting at least one surface of the substrate layer to an electrical corona discharge between a live electrode and a counter electrode and simultaneously, during the corona discharge, introducing an aerosol into the corona discharge area, said aerosol containing an antistatic agent.

2. A sheet-like article according to claim 1, wherein said substrate layer comprises materials having a low electrical conductivity.

3. A sheet-like article according to claim 2, said substrate layer comprising plastic film, paper, synthetic paper or fabrics.

4. A sheet-like article according to claim 3, said substrate layer additionally comprising inert particles in an amount of about 1 to about 25 weight percent, calculated on total weight of said substrate layer.

5. A sheet-like article according to claim 4, said substrate layer comprising inert inorganic particles in an amount of about 2 to about 20 weight percent, calculated on total weight of said substrate layer.

6. A sheet-like article according to claim 1, wherein said electrical corona discharge is performed with an alternating current voltage between about 5,000 and about 25,000V.

7. A sheet-like article according to claim 1, wherein said substrate is moved through said corona discharge area at a constant transportation speed.

8. A sheet-like article according to claim 7, wherein said transportation speed is proportional to the level of the alternating current voltage, at which the corona discharge is performed.

9. A sheet-like article according to claim 1, wherein said aerosol is produced using two-material spray nozzles.

10. A sheet-like article according to claim 1, wherein said aerosol is produced using piezoelectric ultrasound atomization systems.

11. A sheet-like article according to claim 1, wherein said antistatic agent comprises quaternary ammonium compounds, alkyl sulfonates, alkyl sulfates, amino salts, or polymers or copolymers containing quaternary ammonium chloride groups.

12. A sheet-like article according to claim 11, wherein said aerosol is produced from a solution comprising said antistatic agent.

13. A sheet-like article according to claim 12, wherein said solution is an aqueous solution.

14. A sheet-like article according to claim 11, wherein said aerosol is produced from a dispersion comprising said antistatic agent.

15. A sheet-like article according to claim 14, wherein said dispersion is an aqueous dispersion.

16. A firmly adhering an uniform antistatic coating on a sheet-like article according to claim 1 having a thickness corresponding to a weight per unit area of 0.2 to 10 mg/m$^2$.

17. A sheet-like article according to claim 2, wherein said substrate layers comprise plate-like layers of a synthetic resin.

18. A sheet-like article according to claim 1, wherein said aerosol is produced using a piezoelectric ultrasound atomization system.

* * * * *